US012688274B2

(12) United States Patent
Li et al.

(10) Patent No.: US 12,688,274 B2
(45) Date of Patent: Jul. 21, 2026

(54) PRIVATE DISPLAY FOR HEAD MOUNTABLE DEVICE AUTHENTICATION

(71) Applicant: Hewlett-Packard Development Company, L.P., Spring, TX (US)

(72) Inventors: Kuan-Lin Li, Taipei City (TW); Che-Wei Hsu, Taipei City (TW); Yew-Chung Hung, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 225 days.

(21) Appl. No.: 18/689,846

(22) PCT Filed: Sep. 23, 2021

(86) PCT No.: PCT/US2021/051815
§ 371 (c)(1),
(2) Date: Mar. 6, 2024

(87) PCT Pub. No.: WO2023/048719
PCT Pub. Date: Mar. 30, 2023

(65) Prior Publication Data
US 2024/0378279 A1     Nov. 14, 2024

(51) Int. Cl.
*G06F 21/36* (2013.01)

(52) U.S. Cl.
CPC .................................... *G06F 21/36* (2013.01)

(58) Field of Classification Search
None
See application file for complete search history.

(56) References Cited

U.S. PATENT DOCUMENTS 9,092,600 B2 * 7/2015 Scavezze ................ H04L 63/08
9,697,384 B2 * 7/2017 Dow ........................ G06F 21/83
(Continued)

FOREIGN PATENT DOCUMENTS

EP          2887253 A1      6/2015

OTHER PUBLICATIONS

Maiti A, Jadliwala M, Weber C. Preventing shoulder surfing using randomized augmented reality keyboards. In2017 IEEE international conference on pervasive computing and communications workshops (PerCom Workshops) Mar. 13, 2017 (pp. 630-635). IEEE. (Year: 2017).*

(Continued)

*Primary Examiner* — James R Turchen
(74) *Attorney, Agent, or Firm* — Quarles & Brady LLP

(57) ABSTRACT

In an example implementation according to aspects of the present disclosure, a XR system comprises an HMD which includes an HMD display and a motion detection device, an external display of a computing device, and a processor operatively coupled with a computer readable storage medium and instructions stored on the computer readable storage medium that, when executed by the processor, direct the processor to detect an activation of a privacy mode; display, by the HMD display, a first series of images to a user of the HMD; display, by the external display, a second series of images to other users; capture, by the motion detection device, movements of the user selecting a sequence of images of the first series of images displayed on the HMD display; and authenticate the user based on the movements of the user.

20 Claims, 6 Drawing Sheets

(56)         References Cited

U.S. PATENT DOCUMENTS

| | | | | |
|---|---|---|---|---|
| 10,318,744 B2 * | 6/2019 | Dow | .......................... | G06F 21/36 |
| 10,331,874 B1 * | 6/2019 | Benkreira | ............... | G06F 21/36 |
| 10,504,292 B1 * | 12/2019 | Goodsitt | ............... | G07F 19/206 |
| 10,521,793 B2 * | 12/2019 | Tsai | .................... | G06Q 20/4012 |
| 11,282,066 B1 * | 3/2022 | Spender | ............. | G06Q 20/3276 |
| 2015/0062158 A1 * | 3/2015 | Hildreth | ............. | H04N 21/4122 |
| | | | | 345/633 |
| 2016/0092877 A1 * | 3/2016 | Chew | ................. | G06Q 20/4012 |
| | | | | 705/72 |
| 2016/0125411 A1 * | 5/2016 | Briggs | ............... | G06Q 20/4012 |
| | | | | 726/4 |
| 2017/0053443 A1 | 2/2017 | Diament et al. | | |
| 2018/0109510 A1 | 4/2018 | Tommy et al. | | |
| 2018/0285549 A1 * | 10/2018 | Sonkar | ............. | G06Q 20/40145 |
| 2019/0236259 A1 | 8/2019 | Remillet et al. | | |
| 2020/0380784 A1 | 12/2020 | Iyer et al. | | |

OTHER PUBLICATIONS

Winkler C, Gugenheimer J, De Luca A, Haas G, Speidel P, Dobbelstein D, Rukzio E. Glass unlock: Enhancing security of smartphone unlocking through leveraging a private near-eye display. InProceedings of the 33rd annual acm conference on human factors in computing systems Apr. 18, 2015 (pp. 1407-1410). (Year: 2015).*
Papadopoulos A, Nguyen T, Durmus E, Memon N. Illusionpin: Shoulder-surfing resistant authentication using hybrid images. IEEE Transactions on Information Forensics and Security. Jul. 11, 2017; 12(12):2875-89. (Year: 2017).*

* cited by examiner

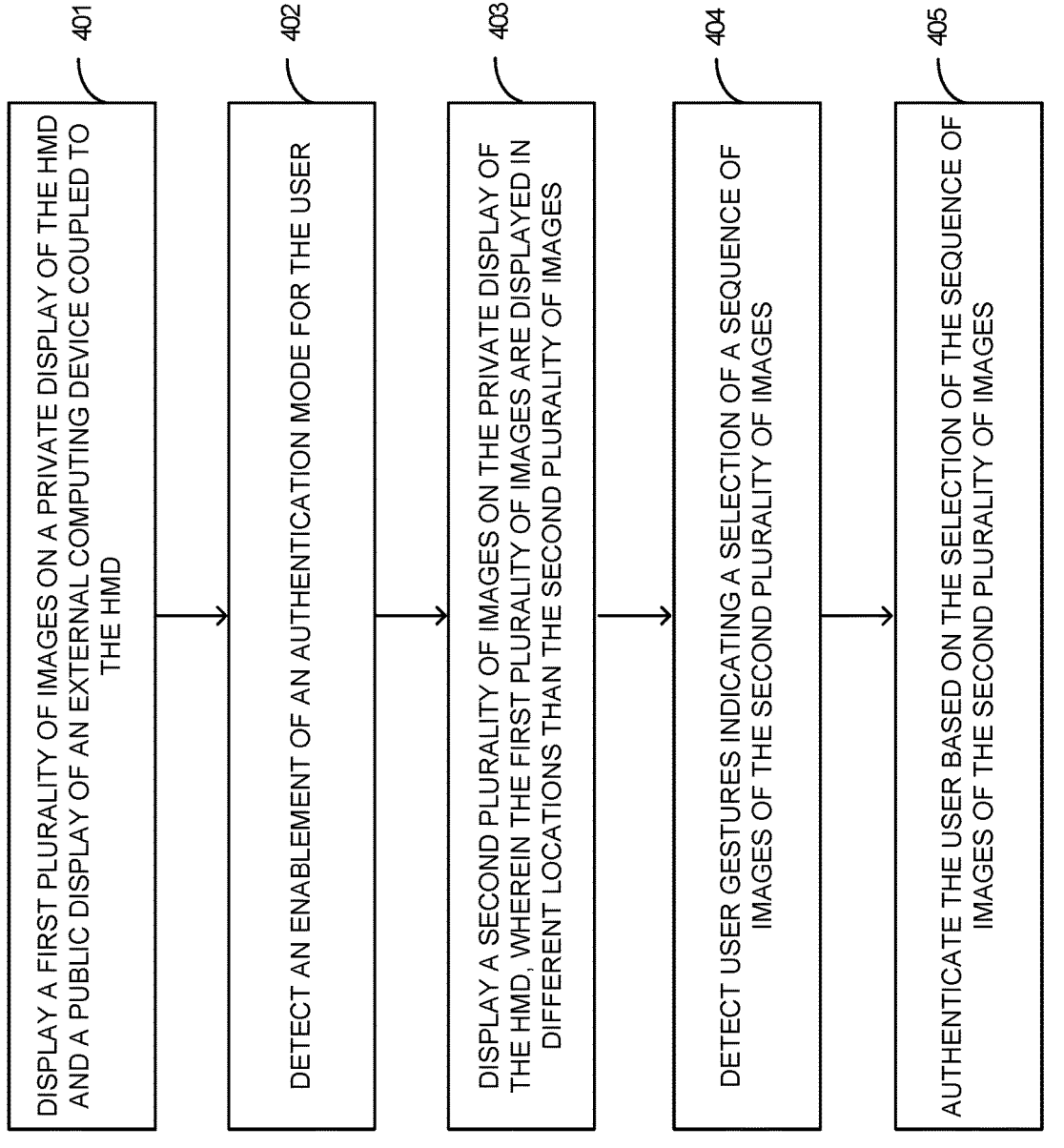

400

401

DISPLAY A FIRST PLURALITY OF IMAGES ON A PRIVATE DISPLAY OF THE HMD AND A PUBLIC DISPLAY OF AN EXTERNAL COMPUTING DEVICE COUPLED TO THE HMD

402

DETECT AN ENABLEMENT OF AN AUTHENTICATION MODE FOR THE USER

403

DISPLAY A SECOND PLURALITY OF IMAGES ON THE PRIVATE DISPLAY OF THE HMD, WHEREIN THE FIRST PLURALITY OF IMAGES ARE DISPLAYED IN DIFFERENT LOCATIONS THAN THE SECOND PLURALITY OF IMAGES

404

DETECT USER GESTURES INDICATING A SELECTION OF A SEQUENCE OF IMAGES OF THE SECOND PLURALITY OF IMAGES

405

AUTHENTICATE THE USER BASED ON THE SELECTION OF THE SEQUENCE OF IMAGES OF THE SECOND PLURALITY OF IMAGES

FIG. 4

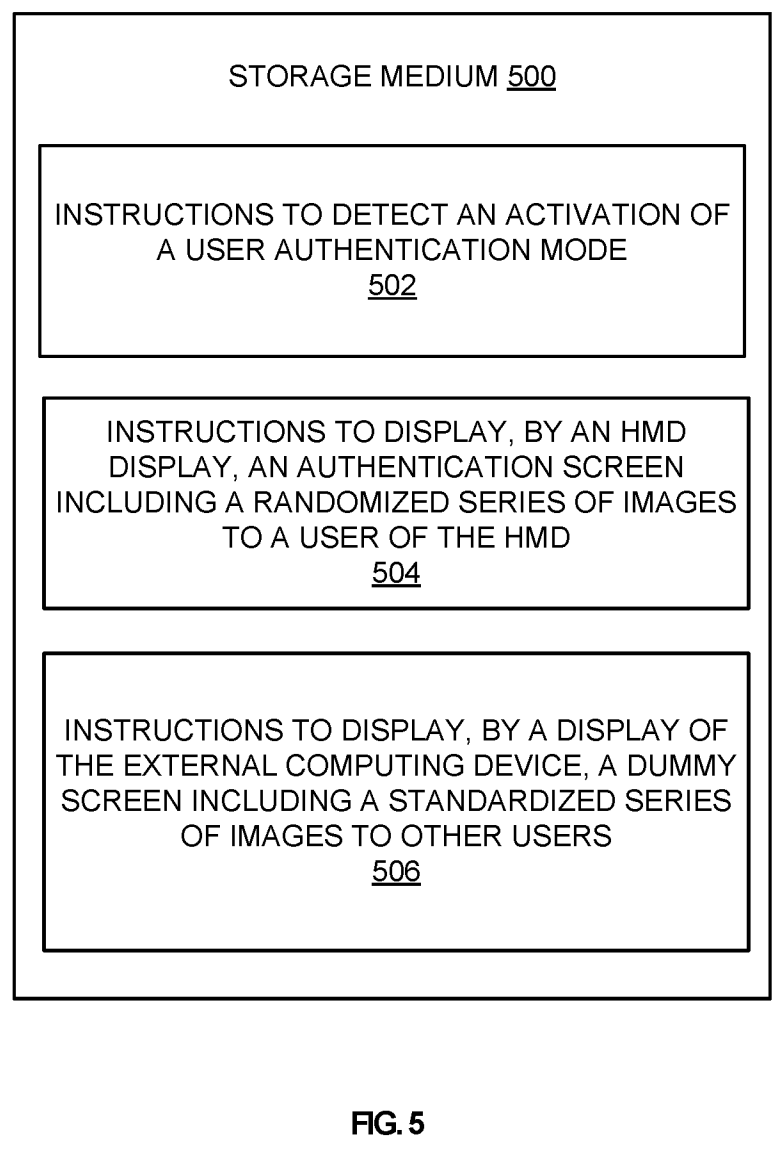

STORAGE MEDIUM 500

INSTRUCTIONS TO DETECT AN ACTIVATION OF A USER AUTHENTICATION MODE
502

INSTRUCTIONS TO DISPLAY, BY AN HMD DISPLAY, AN AUTHENTICATION SCREEN INCLUDING A RANDOMIZED SERIES OF IMAGES TO A USER OF THE HMD
504

INSTRUCTIONS TO DISPLAY, BY A DISPLAY OF THE EXTERNAL COMPUTING DEVICE, A DUMMY SCREEN INCLUDING A STANDARDIZED SERIES OF IMAGES TO OTHER USERS
506

FIG. 5

PRIVATE DISPLAY FOR HEAD MOUNTABLE DEVICE AUTHENTICATION

BACKGROUND

Head mounted devices may be used to provide an altered reality to a user. An extended reality (XR) device may include a virtual reality (VR) device, an augmented reality (AR) device, and/or a mixed reality (MR) device. XR devices may include displays to provide a VR, AR, or MR experience to the user by providing video, images, and/or other visual stimuli to the user via the displays. XR devices may be worn by a user.

BRIEF DESCRIPTION OF THE DRAWINGS

Many aspects of the disclosure can be better understood with reference to the following drawings. While several examples are described in connection with these drawings, the disclosure is not limited to the examples disclosed herein.

FIG. 4 illustrates a flow diagram of a process to authenticate a user of an HMD using a private display, according to an example;

FIG. 5 illustrates a block diagram of a non-transitory storage medium storing machine-readable instructions to authenticate a user of an HMD using a private display, according to an example.

DETAILED DESCRIPTION

Figure 1:
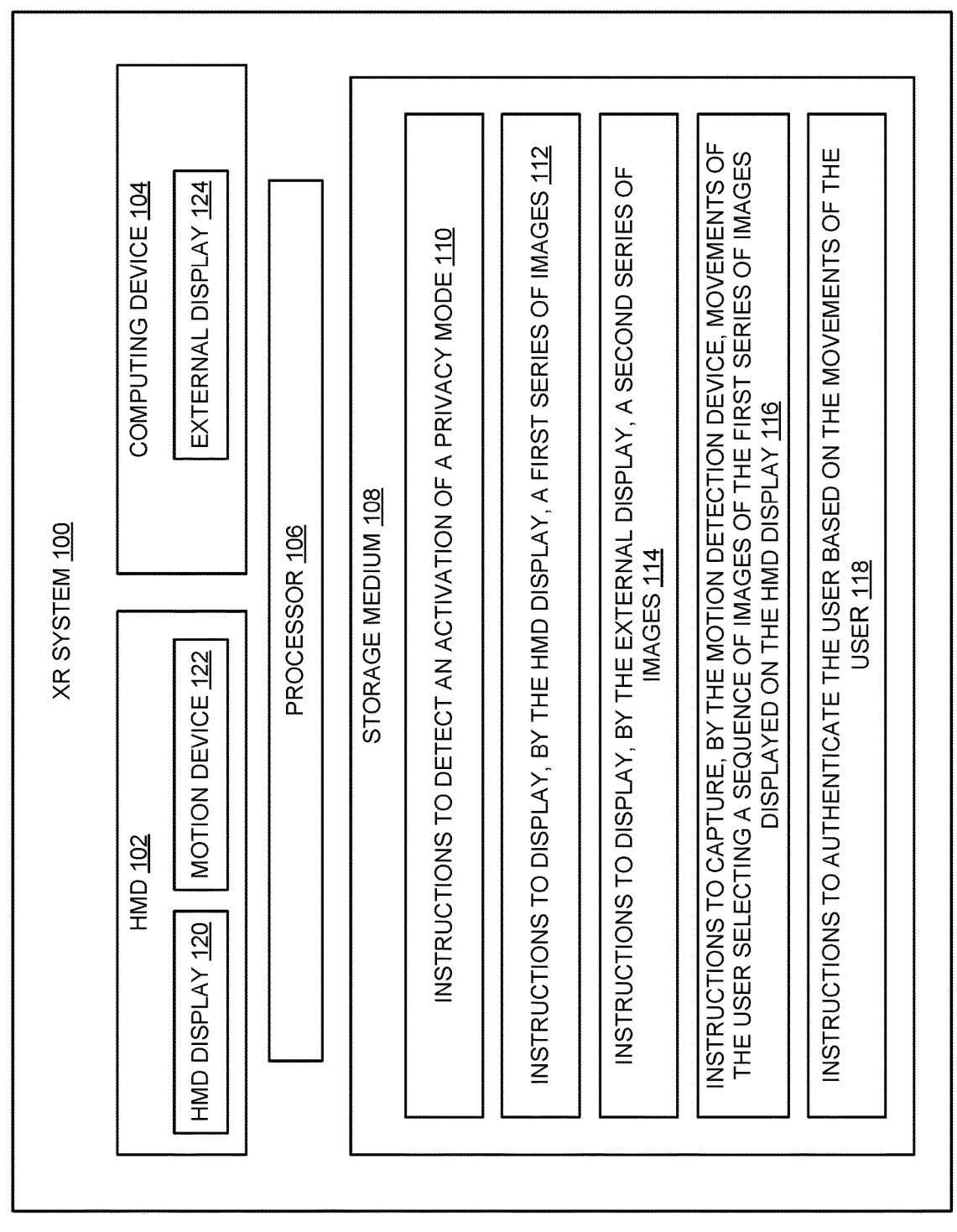
FIG. 1 illustrates a block diagram of an extended reality (XR) system for authenticating a user of a head mountable device (HMD) using a private display, according to an example.

Extended reality (XR) devices may provide an altered reality to a user by providing video, audio, images, and/or other stimuli to a user via a display. As used herein, the term "XR device" refers to a device that provides a virtual reality (VR), augmented reality (AR), and/or mixed reality (MR) experience for a user.

The XR device may be experienced by a user through the use of a head mount device (e.g., a headset). For example, a user may wear the headset in order to view the display of the XR device and/or experience audio stimuli of the XR device. As used herein, the term "extended reality" refers to a computing device generated scenario that simulates experience through senses and perception. In some examples, an XR device may cover a user's eyes and provide visual stimuli to the user via a display, thereby substituting an "extended" reality (e.g., a "virtual reality", "augmented reality" and/or "mixed reality") for actual reality.

Computing devices provide access to data and applications to users. Such informational exchange is independent of geographic boundaries and may be portable. For example, a user may access certain information stored on their home computing device even when they are not at home, for example through an XR device. The global nature of information exchange provides countless benefits to users of those computing devices as information has become more widespread and portable. However, the user must be authenticated prior to accessing the private information or personal applications.

While a user may be prompted to enter passwords, credentials, etc. prior to accessing the information or applications, this generally includes the private data being displayed on both the HMD and an external screen to interact with the system. Furthermore, many users may not be able to see the external screen while entering passwords and credentials for various applications.

The present disclosure provides an HMD system which may authenticate the user using a private display. This allows the user to be authenticated on the XR device without the user needing to hide an external screen, change settings of the external screen, or ensure other users are not around to interpret what password and credentials the user is entering.

In an example implementation according to aspects of the present disclosure, a XR system comprises an HMD which includes an HMD display and a motion detection device, an external display of a computing device, and a processor operatively coupled with a computer readable storage medium and instructions stored on the computer readable storage medium that, when executed by the processor, direct the processor to detect an activation of a privacy mode; display, by the HMD display, a first series of images to a user of the HMD; display, by the external display, second series of images to other users; capture, by the motion detection device, movements of the user selecting a sequence of images of the first series of images displayed on the HMD display; and authenticate the user based on the movements of the user.

In another example implementation, a method of authorizing a user of an HMD comprises displaying a first plurality of images on a private display of the HMD and a public display of an external computing device coupled to the HMD. The method also includes detecting an enablement of an authentication mode for the user. In response, a second plurality of images is displayed on the private display of the HMD, wherein the first plurality of images is displayed in different locations than the second plurality of images. The method then includes detecting user gestures indicating a selection of a sequence of images of the second plurality of images and authorizing the user based on the selection of the sequence of images of the second plurality of images.

In yet another example, a non-transitory computer readable medium comprises instructions executable by a processor to detect an activation of a user authentication mode. The instructions executable by the processor further display, by an HMD display, an authentication screen including a randomized series of images to a user of the HMD. The instructions executable by the processor further display, by a display of the external computing device, a dummy screen including a standardized series of images to other users.

FIG. 1 illustrates a block diagram of XR system 100 for authenticating a user of an HMD using a private display, according to an example. XR system 100 depicts HMD 102, computing device 104, processor 106, and storage medium

108. As an example of XR system 100 performing its operations, storage medium 108 may include instructions 110-118 that are executable by processor 106. Thus, storage medium 108 can be said to store program instructions that, when executed by processor 106, implement the components of XR system 100. Further, HMD 102 includes HMD display 120 and motion detection device 122. Computing device 104 includes external display 124.

Figure 2:
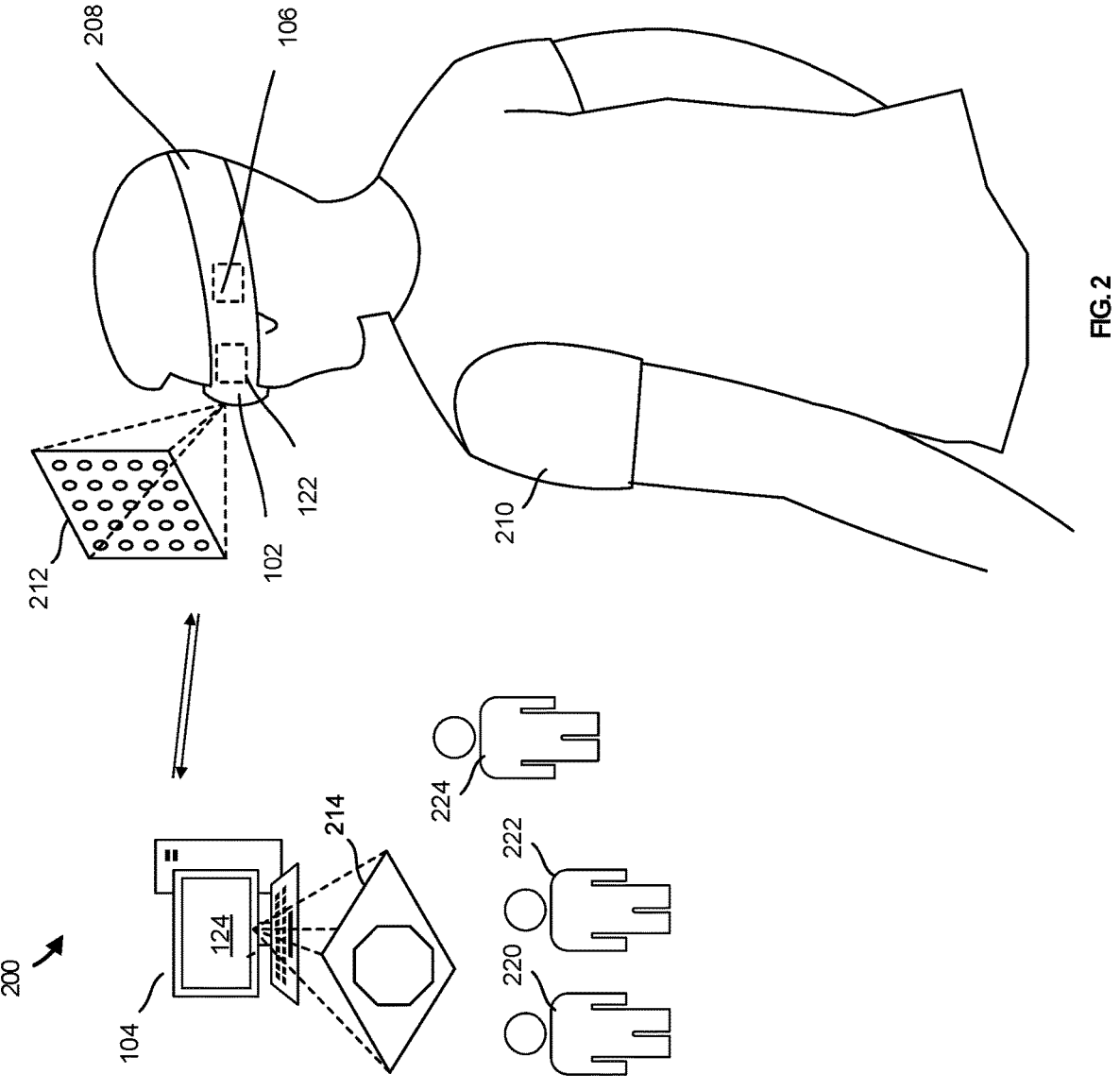
FIG. 2 illustrates a diagram of a user wearing an HMD which authenticates the user using a private display, according to an example.

HMD display 120 and external display 124 refer to any device that presents visual information to viewers. Examples of HMD display 120 and external display 124 include computer screens, smart device screens, tablet screens, and mobile device screens. In one particular example, HMD display 120 is formed in a headset that is worn by a user when using an enhanced reality system and external display 124 is displayed on computing device 104 to users not wearing the headset. An example of such a headset and external display is depicted in FIG. 2 below.

HMD 102 also includes motion detection device 122 to capture body movements of a user looking at HMD display 120. In general, motion detection device 122 is an electronic system that detects and reports at least a user's head movements or body movements. For example, motion detection device 122 may include an inertial measurement unit (IMU), a camera, a gyroscope, an accelerometer, or some other device capable to detecting a user gesture or movement. In some examples, motion detection device 122 may include a three degrees of freedom (3DoF) IMU to measure rotational movements performed by the user. In other examples, the motion detection device 122 may a six degrees of freedom (6DoF) IMU to measure rotational movements and translational movements performed by the user. In yet another example, motion detection device 122 may include an infrared or visible light camera. The position of the user's body within the camera's image frame can be used to determine where the user is motioning.

In some examples, motion detection device 122 is integrated onto HMD 102. For example, motion detection device 122 may be formed on a same surface of an internal part of the housing that HMD 102 is formed and may point towards the user's body or head. In another example, motion detection device 122 may be located on computing device 104 where a camera is directed towards the user to track their head and body movements and positions. In yet another example, XR system 100 may include hand controllers communicately coupled to HMD 102 and computing device 104 for the user to hold and indicate hand gestures.

Processor 106 includes the hardware architecture to retrieve executable code from the memory and execute the executable code. As specific examples, Processor 106 as described herein may include a controller, an application-specific integrated circuit (ASIC), a semiconductor-based microprocessor, a central processing unit (CPU), and a field-programmable gate array (FPGA), and/or other hardware device.

Storage medium 108 represents any number of memory components capable of storing instructions that can be executed by processor 106. As a result, storage medium 108 may be implemented in a single device or distributed across devices. Likewise, processor 106 represents any number of processors capable of executing instructions stored by storage medium 108.

In some examples, HMD 102 may comprise an All-In-One (AIO) device HMD 102 includes a processor (e.g., processor 106) and a storage system (e.g., storage medium 108) and wherein at least a portion of instructions 110-118 are included on HMD 102. In other examples, HMD 102 may be tethered (either wirelessly or wired) to computing device 104 to receive instructions from processor 106 and storage system 108 residing on computing device 104.

In particular, the executable instructions stored in storage medium 108 include, as an example, instructions 110 represent program instructions that when executed by processor 106 cause XR system 100 to detect an activation of a privacy mode. The activation of the privacy mode may be triggered by the user or by an application running on XR system 100 (e.g., display of an authentication screen, a prompt for a user to enter credentials, etc.).

Instructions 112 represent program instructions that when executed by processor 106 cause XR system 100 to display, by HMD display 120, a first series of images to a user of HMD 102. In some examples, the first series of images are randomized each time the user of HMD 102 is authenticated. In this example, the first series of images are displayed using a private display in which only the user of HMD 102 would be able to view.

Instructions 114 represent program instructions that when executed by processor 106 cause XR system 100 to display, by external display 124, a second series of images to other users. In some examples, the first series of images includes numbers or symbols located in different locations than the second series of images. For example, the numbers on an authentication screen may be rearranged on external display 124 than those numbers displayed on HMD display 120.

Instructions 116 represent program instructions that when executed by processor 106 cause XR system 100 to capture, by motion detection device 122, movements of the user selecting a sequence of images of the first series of images displayed on HMD display 120. In some examples, XR system 100 further comprises hand controllers (e.g., including a gyroscope and/or an accelerometer) to detect user hand gestures indicating the selected sequence of images of the first series of images displayed on the HMD display 120.

Instructions 118 represent program instructions that when executed by processor 106 cause XR system 100 to authenticate the user based on the movements of the user. For example, the user's selection of images of the first series of images may indicate user credentials and/or a passcode which may be used to authenticate the user. Since other users would be viewing external display 124, instead of HMD display 120, the other users would not be able to know which images of the first series of images that the user had selected in the sequential order. The user may be authenticated by an application running on HMD 102, computing device 104, or some other computing device communicately coupled to XR system 100 (e.g., application operating in a cloud-based environment).

FIG. 2 illustrates a diagram of a user wearing an HMD which authenticates the user using a private screen, according to an example. As described above, XR system 100 may be formed in an enhanced reality system. Accordingly, HMD 102 may be an HMD that is worn by user 210 to generate visual, auditory, and other sensory environments, to detect user input, and to manipulate the environments based on the user input. While FIG. 2 depicts a particular configuration of XR HMD 208, any type of enhanced reality headset may be used in accordance with the principles described herein.

FIG. 2 also depicts dashed boxes representing processor 106 and motion detection device 122. While FIG. 2 depicts these components disposed on XR HMD 208, either of these components may be placed on another device. For example, processor 106 may be found on computing device 104. That is, XR HMD 208 is communicatively coupled to a host computing device, such as computing device 104. In this manner, execution of computer readable program code by a processor associated with computing device 104 causes a view of an enhanced reality environment to be displayed in XR HMD 208. In some examples, processor 106 of XR system 100 may be disposed on computing device 104.

In some examples, XR HMD 208 implements a stereoscopic head-mounted display that provides separate images for the user viewing HMD display 102 from images displayed to other users 220-224 viewing external display 124 on computing device 104. In some examples, XR HMD 208 may provide stereo sound to user 210. In an example, XR HMD 208 may include a head motion tracking sensor that includes a gyroscope and/or an accelerometer.

As described above, via HMD 102 and computing device 104, user 210 may be authenticated via movements of the head or body during login/authentication and comparing those movements to a movement authentication pattern for the user. In some examples, HMD 102 displays a visual sequence of images 212. Such visual sequence of images 212 provides images in various locations, to the identity of user 210. In the example depicted in FIG. 2, visual sequence of images 212 is a grid and visual sequence of images 214 is an octagon, however visual sequence of images 212 and visual sequence of images 214 may take other forms as long as they are not the same.

In some examples, XR HMD 208 may detect when a user takes on/off XR HMD 208 and XR system 100 may take appropriate action. For example, when taken off, XR system 100 may re-trigger the authentication process and end a current session. In this example, XR system 100 may include an IMU or other motion sensing unit to detect when XR HMD 208 is taken off completely (not just resting on the head). The same sensing unit may be used to determine when XR HMD 208 is put back on a user head. XR system 100 may first identify the user of XR HMD 208 before authenticating the user using the private display on HMD display 102.

As described above, the authentication movements to authenticate the user is user-specific and so may be transferable to other devices. In this example, the authentication movements are associated with supporting authentication credentials (such as voice ID, touch ID, or password) such that the authentication movements is retrieved on any device where supporting authentication credentials are input. For example, if user 210 switches to a different enhanced reality headset, user 210 may input their voice ID or touch ID.

XR system 100 may uniquely identify user 210 from a database of users. After this, XR system 100 logs the device name in the user's account and creates encrypted information that includes their unique authentication movements which allows them to login.

Figures 3A, 3B:
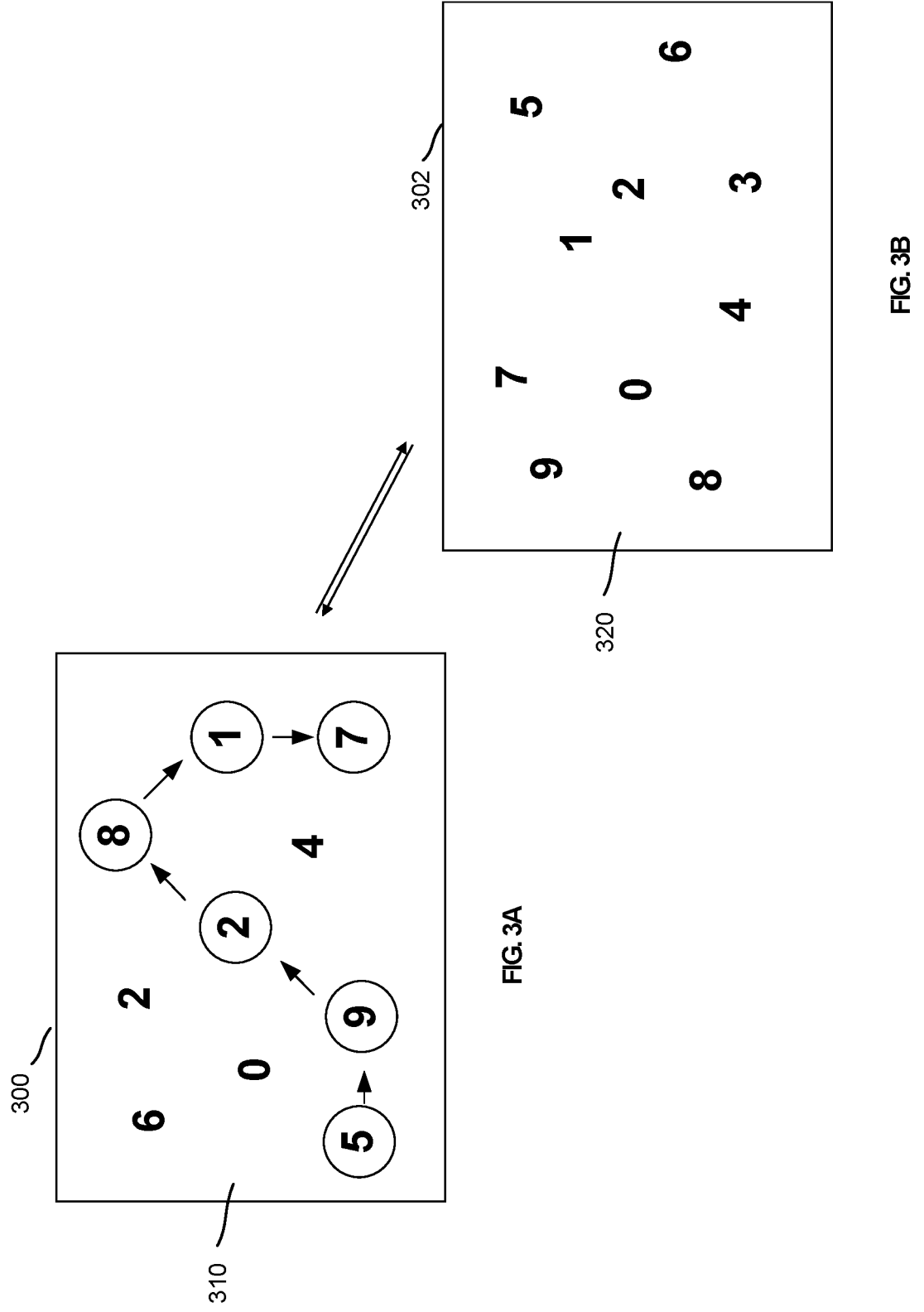
FIG. 3A illustrates a screenshot of displayed images used to authenticate a user using a private display, according to an example.
FIG. 3B illustrates a screenshot of displayed images displayed to other users using a public display, according to an example.

FIG. 3A illustrates a screenshot of displayed images used to authenticate a user using the private display, according to an example. That is, FIG. 3 depicts operation of XR system 100 in an authentication mode. As seen in private screenshot 300, a user is prompted to view a first sequence of images 310. First sequence of images 310 includes a variety of numbers for the user to select for authentication.

Referring to FIG. 3B, FIG. 3B illustrates a screenshot of displayed images displayed to other users using a public display, according to an example. As seen in public screenshot 302, other users are displayed with second sequence of images 312. Second sequence of images 312 includes a variety of numbers in a different location than the numbers placed on first sequence of images 310.

In response to being shown, the user makes head gestures or body bodements to select numbers indicating a password.

Since second sequence of images 312 includes numbers in different locations, other users viewing an external display on a host computing device are unable to determine which numbers the user is selecting for authentication. Note that while FIG. 3A and FIG. 3B depict a particular order of images, any order may be implemented.

FIG. 4 illustrates a flow diagram of method 400 to, according to an example. Some or all of the steps of method 400 may be implemented in program instructions in the context of a component or components of an application used to carry out the user authentication. Although the flow diagram of FIG. 4 shows a specific order of execution, the order of execution may differ from that which is depicted. For example, the order of execution of two of more blocks shown in succession by be executed concurrently or with partial concurrence. All such variations are within the scope of the present disclosure.

Referring parenthetically to the steps in FIG. 4, method 400 displays a first plurality of images on a private display of the HMD and a public display of an external computing device coupled to the HMD, at 401. In some examples, the second plurality of images comprises a series of numbers or symbols which are randomly placed each time the user is authenticated.

Method 400 detects an enablement of an authentication mode for the user, at 402. In response, method 400 displays a second plurality of images on the private display of the HMD, wherein the first plurality of images are displayed in different locations than the second plurality of images, at 403.

In some examples, the HMD is tethered to the external computing device. In this example, the external computing device generates the first plurality of images to be displayed on the public display of the external computing device and second plurality of images to be displayed on the private display of the HMD. Further in this example, the external computing device transfers the second plurality of images to be displayed on the private display of the HMD in response to the enablement of the authentication mode.

In other examples, the HMD comprises an All-In-One (AIO) headset. In this example, the HMD generates the first plurality of images to be displayed on the public display of the external computing device and the second plurality of images to be displayed on the private display of the HMD. Further in this example, the HMD transfers the first plurality of images to the external computing device to be displayed on the public display of the external computing device.

Method 400 detects user gestures indicating a selection of a sequence of images of the second plurality of images, at 404. In some examples, the HMD includes an IMU to detect the user gestures indicating the selection of the sequence of images of the second plurality of images. The IMU may include a 3DoF IMU to measure rotational movements performed by the user. In other examples, the IMU may include a 6DoF IMU to measure rotational movements and translational movements performed by the user. In some examples, the user gesture is detected based on a head gesture by the user of the HMD. In other examples, the user gesture is detected based on a hand gesture by the user of the HMD. Method 400 authenticates the user based on the selection of the sequence of images of the second plurality of images, at 405.

FIG. 5 illustrates a block diagram of non-transitory storage medium 500 storing machine-readable instructions that upon execution cause a system to authenticate a user of an HMD using a private display, according to an example. Storage medium is non-transitory in the sense that is does not encompass a transitory signal but instead is made up of a memory component configured to store the relevant instructions.

The machine-readable instructions include instructions 502 to detect an activation of a user authentication mode. The machine-readable instructions also include instructions 504 to display, by an HMD display, an authentication screen including a randomized series of images to a user of the HMD. The machine-readable instructions also include instructions 506 to display, by a display of the external computing device, a dummy screen including a standardized series of images to other users.

In one example, program instructions 502-506 can be part of an installation package that when installed can be executed by a processor to implement the components of a computing device. In this case, non-transitory storage medium 500 may be a portable medium such as a CD, DVD, or a flash drive. Non-transitory storage medium 500 may also be maintained by a server from which the installation package can be downloaded and installed. In another example, the program instructions may be part of an application or applications already installed. Here, non-transitory storage medium 500 can include integrated memory, such as a hard drive, solid state drive, and the like.

Figure 6:
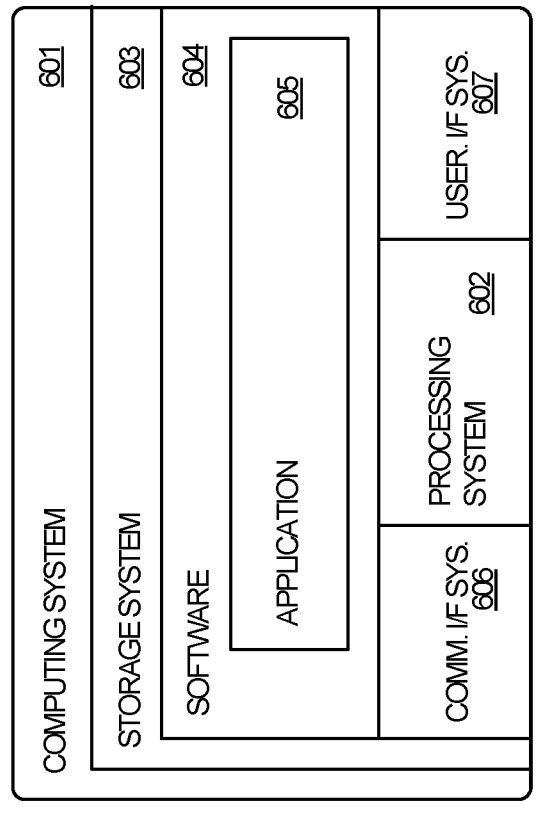
FIG. 6 illustrates a block diagram of a computing system, which is representative of any system or visual representation of systems in which the various applications, services, scenarios, and processes disclosed herein may be implemented.

FIG. 6 illustrates a block diagram of computing system 601, which is representative of any system or visual representation of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 604, communication interface system 606, and user interface system 607. Processing system 602 is operatively coupled with storage system 603, communication interface system 606, and user interface system 607.

Processing system 602 loads and executes software 604 from storage system 603. Software 604 includes application 605, which is representative of the processes discussed with respect to the preceding FIGS. 1-5, including method 200. When executed by processing system 602 to enhance an application, software 604 directs processing system 602 to operate as described herein for at least the various processes, operational scenarios, and sequences discussed in the foregoing examples. Computing system 601 may optionally include additional devices, features, or functionality not discussed for purposes of brevity.

Referring still to FIG. 6, processing system 602 may comprise a microprocessor and other circuitry that retrieves and executes software 604 from storage system 603. Processing system 602 may be implemented within a single processing device but may also be distributed across multiple processing devices or sub-systems that cooperate in executing program instructions. Examples of processing system 602 include general purpose central processing units, graphical processing unites, application specific processors, and logic devices, as well as any other type of processing device, combination, or variation.

Storage system 603 may comprise any computer readable storage media readable by processing system 602 and capable of storing software 604. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 604 may be implemented in program instructions and among other functions may, when executed by processing system 602, direct processing system 602 to operate as described with respect to the various operational scenarios, sequences, and processes illustrated herein. Software 604 may include program instructions for implementing method 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 604 may include additional processes, programs, or components, such as operating system software, virtual machine software, or other application software, in addition to or that include application 605. Software 604 may also comprise firmware or some other form of machine-readable processing instructions executable by processing system 602.

In general, software 604 may, when loaded into processing system 602 and executed, transform a suitable apparatus, system, or device (of which computing system 601 is representative) overall from a general-purpose computing system into a special-purpose computing system. Indeed, encoding software 604 on storage system 603 may transform the physical structure of storage system 603. The specific transformation of the physical structure may depend on various factors in different examples of this description. Such factors may include, but are not limited to, the technology used to implement the storage media of storage system 603 and whether the computer-storage media are characterized as primary or secondary storage, as well as other factors.

If the computer readable storage media are implemented as semiconductor-based memory, software 604 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 606 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 607 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 607. In some cases, the input and output devices may be combined in a single device, such as a display capable of displaying images and receiving touch gestures. The aforementioned user input and output devices are well known in the art and need not be discussed at length here. User interface system 607 may also include associated user interface software executable by processing system 602 in support of the various user input and output devices discussed above.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. Certain inventive aspects may be appreciated from the foregoing disclosure, of which the following are various examples.

The functional block diagrams, operational scenarios and sequences, and flow diagrams provided in the FIGS. are representative of example systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. It should be noted that a method could alternatively be represented as a series of interrelated states or events, such as in a state diagram. Moreover, not all acts illustrated in a methodology may be required for a novel example.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

The invention claimed is:

1. A method of authorizing a user of a head mountable device (HMD), comprising:

displaying a first plurality of authentication images on a private display of the HMD and a public display of an external computing device coupled to the HMD;

detecting an enablement of an authentication mode for the user;

in response, displaying a second plurality of authentication images on the private display of the HMD, wherein the first plurality of authentication images are displayed in different locations than the second plurality of authentication images;

detecting, by a motion detection device of the HMD, user gestures indicating a selection of a sequence of images of the second plurality of authentication images; and authorizing the user based on the selection of the sequence of images of the second plurality of authentication images.

2. The method of claim 1, wherein the HMD is tethered to the external computing device, and further comprising:

the external computing device generating the first plurality of images to be displayed on the public display of the external computing device and the second plurality of images to be displayed on the private display of the HMD; and the external computing device transferring the second plurality of images to the HMD to be displayed on the private display of the HMD.

3. The method of claim 1, wherein the HMD comprises an All-In-One (AIO) headset and further comprising:

the HMD generating the first plurality of images to be displayed on the public display of the external computing device and the second plurality of images to be displayed on the private display of the HMD; and the HMD transferring the first plurality of images to the external computing device to be displayed on the public display of the external computing device.

4. The method of claim 1, wherein the HMD includes an inertial measurement unit (IMU) to detect the user gestures indicating the selection of the sequence of images of the second plurality of images.

5. The method of claim 4, wherein the IMU includes a three degrees of freedom (3DoF) IMU to measure rotational movements performed by the user.

6. The method of claim 4, wherein the IMU includes a six degrees of freedom (6DoF) IMU to measure rotational movements and translational movements performed by the user.

7. The method of claim 1, wherein detecting the user gestures comprises detecting a head gesture by the user of the HMD.

8. The method of claim 1, wherein detecting the user gestures comprises detecting a hand gesture by the user of the HMD.

9. The method of claim 1, wherein the second plurality of images comprises a series of numbers or symbols which are randomly placed each time the user is authenticated.

10. The method of claim 1, wherein the enablement of the authentication mode is triggered by the user or by an application running on the HMD or the external computing device.

11. The method of claim 1, wherein authorizing the user comprises comparing the detected user gestures to a movement authentication pattern associated with the user.

12. An extended reality (XR) system, comprising:
a head mountable device (HMD) comprising:
    an HMD display; and
    a motion detection device;
an external display of a computing device, wherein the computing device is communicately coupled to the HMD; and
a processor operatively coupled with a computer readable storage medium and instructions stored on the computer readable storage medium that, when read and executed by the processor, direct the processor to:
    detect an activation of a privacy mode;
    display, by the HMD display, a first series of authentication images to a user of the HMD;
    display, by the external display, a second series of authentication images to other users;
    capture, by the motion detection device, movements of the user selecting a sequence of images of the first series of authentication images displayed on the HMD display; and
    authenticate the user based on the movements of the user.

13. The XR system of claim 12, wherein the first series of authentication images includes numbers or symbols located in different locations than the second series of authentication images.

14. The XR system of claim 12, wherein the first series of authentication images are randomized each time the user of the HMD is authenticated.

15. The XR system of claim 12, wherein motion detection device comprises an inertial measurement unit (IMU) to detect a user head gesture.

16. The XR system of claim 12, further comprising hand controllers to detect user hand gestures indicating the selected sequence of images of the first series of images displayed on the HMD display.

17. The XR system of claim 12, wherein the HMD comprises a stereoscopic head-mounted display configured to provide separate images to the user of the HMD from images displayed to other users on the external display.

18. The XR system of claim 12, wherein the processor is further configured to detect that the HMD has been removed from the user and, in response, re-trigger authentication and end a current session.

19. A non-transitory computer-readable storage medium storing instructions that, when executed by a processor, cause the processor to:
    detect an activation of a user authentication mode;
    display, by an HMD display, an authentication screen including a randomized series of authentication images to a user of the HMD;
    display, by an external display of a computing device, a dummy screen including a standardized series of authentication images to other users;
    capture, by a motion detection device of the HMD, movements of the user selecting a sequence of images of the randomized series of authentication images displayed on the HMD display; and
    authenticate the user based on the movements of the user.

20. The non-transitory computer-readable storage medium of claim 19, wherein the randomized series of authentication images comprises numbers or symbols located in different locations than corresponding numbers or symbols of the standardized series of authentication images.

* * * * *